(12) United States Patent
Minase et al.

(10) Patent No.: US 11,511,804 B2
(45) Date of Patent: Nov. 29, 2022

(54) PARKING ASSISTANCE APPARATUS

(71) Applicant: TOYOTA JIDOSHA KABUSHIKI KAISHA, Toyota (JP)

(72) Inventors: Yuki Minase, Toyota (JP); Takuya Nakagawa, Nagoya (JP); Junji Horiguchi, Nagoya (JP); Norio Imai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 17/065,144

(22) Filed: Oct. 7, 2020

(65) Prior Publication Data

US 2021/0107564 A1 Apr. 15, 2021

(30) Foreign Application Priority Data

Oct. 11, 2019 (JP) .............................. JP2019-187463

(51) Int. Cl.
*B62D 15/02* (2006.01)
*G01C 21/34* (2006.01)
*G08G 1/14* (2006.01)

(52) U.S. Cl.
CPC ....... *B62D 15/027* (2013.01); *G01C 21/3407* (2013.01); *G08G 1/143* (2013.01)

(58) Field of Classification Search
CPC ............. B60W 30/06; B60W 30/0956; B60W 40/114; B60W 2420/50; B60W 2554/80;
(Continued)

(56) References Cited

U.S. PATENT DOCUMENTS 9,522,661 B2 12/2016 Inoue et al.
9,604,638 B2 3/2017 Kiyokawa et al.
(Continued)

FOREIGN PATENT DOCUMENTS

CN 107585159 A * 1/2018 ......... B62D 15/0285
CN 107644549 A * 1/2018
(Continued)

OTHER PUBLICATIONS

JP2003237511.translation.English, Parking Supporting Device (Year: 2003).*

(Continued)

*Primary Examiner* — B M M Hannan
(74) *Attorney, Agent, or Firm* — Sughrue Mion, PLLC

(57) ABSTRACT

A parking assistance apparatus obtains a target travelling route from a present position of a vehicle to a target parking position and controls the vehicle such that the vehicle moves along the target travelling route. The target travelling route is obtained such that the vehicle moves backward to reach the target parking position and the vehicle is moves in a region on the target parking position side of a travelling boundary line. The travelling boundary line is a straight line which is in front of the vehicle located at the target parking position and which is away from a reference position by a boundary distance. The reference position is a position at a front end and at a center in a lateral direction of the vehicle located at the target parking position. The boundary distance is a configurable value changed by a driver of the vehicle.

6 Claims, 9 Drawing Sheets

(58) Field of Classification Search
CPC ..... B60W 30/08; G08G 1/0962; G08G 1/165; G08G 1/166; G08G 1/168; B62D 15/0285
USPC .......................................................... 701/41
See application file for complete search history.

(56) References Cited

U.S. PATENT DOCUMENTS

| | | | |
|---|---|---|---|
| 9,738,276 B2 | 8/2017 | Kiyokawa et al. | |
| 9,802,588 B2 | 10/2017 | Inoue et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,239,520 B2 | 3/2019 | Tomozawa et al. | |
| 10,377,416 B2 | 8/2019 | Fukukawa et al. | |
| 10,494,025 B2 | 12/2019 | Nakamura | |
| 2002/0175832 A1* | 11/2002 | Mizusawa | B62D 15/028 340/932.2 |
| 2005/0288851 A1* | 12/2005 | Yokota | G01C 21/3667 701/461 |
| 2015/0057889 A1* | 2/2015 | Tamaizumi | B62D 5/0463 701/41 |
| 2015/0237311 A1* | 8/2015 | Hattori | H04N 7/181 348/148 |
| 2015/0241225 A1* | 8/2015 | Liu | G01C 21/3682 701/540 |
| 2017/0028914 A1* | 2/2017 | Kiyokawa | B62D 15/0285 |
| 2018/0003505 A1* | 1/2018 | Tateishi | G01C 21/34 |
| 2018/0022329 A1* | 1/2018 | Sannodo | B60T 7/12 701/70 |
| 2018/0099661 A1* | 4/2018 | Bae | B62D 15/0285 |
| 2018/0362073 A1* | 12/2018 | Hirate | B62D 15/0285 |
| 2019/0073901 A1* | 3/2019 | Shurkhovetskyy | G08G 1/096716 |
| 2019/0225267 A1 | 7/2019 | Ohtani et al. | |
| 2019/0300054 A1* | 10/2019 | Mochida | G06V 20/586 |
| 2020/0377088 A1* | 12/2020 | Fukushige | B60W 30/18163 |

FOREIGN PATENT DOCUMENTS

| | | | | |
|---|---|---|---|---|
| CN | 107757609 A | * | 3/2018 | ............ B60W 30/06 |
| CN | 109540535 A | * | 3/2019 | |
| CN | 109559550 A | * | 4/2019 | ............ G08G 1/143 |
| CN | 209397968 U | | 9/2019 | |
| CN | 111976601 A | * | 11/2020 | ............... B60R 1/00 |
| GB | 2558257 B | * | 9/2019 | ........... A01B 79/005 |
| JP | 2003-237511 A | | 8/2003 | |
| JP | 2016124401 A | * | 7/2016 | ............ B60Q 9/005 |
| JP | 2019-128643 A | | 8/2019 | |
| RU | 2678909 C2 | * | 2/2019 | ............. B60R 21/00 |

OTHER PUBLICATIONS

JP2016124401A.Translate.English, Parking Support Device (Year: 2016).*
CN209397968.translate.English, Warehousing vehicle parking system and parking lot (Year: 2019).*

* cited by examiner

PARKING ASSISTANCE APPARATUS

TECHNICAL FIELD

The present disclosure relates to a parking assistance apparatus configured to execute parking assistance processing to assist a vehicle to move to a target parking position.

BACKGROUND

A conventionally known parking assistance apparatus (hereinafter also referred to as the "conventional apparatus") obtains (determines) a "target travelling route (path)" from an initial position to a "target parking position" such that a vehicle moves (travels) backward and turns along that target travelling route so as to reach the target parking position.

If it is impossible to directly reach the target parking position from the initial position only by moving backward, the conventional apparatus obtains the target travelling route which includes a section along which the vehicle moves backward to reach a position close to the target parking position, a section along which the vehicle moves forward provisionally (temporarily), and a section along which the vehicle moves backward to reach the target parking position.

Namely, in this case, the target travelling route includes "shift switching positions" at which a shift mode of the vehicle is switched between a forward mode and a backward mode (see, for example, Japanese Patent Application Laid-Open (kokai) No. 2003-237511).

SUMMARY

In general, it is preferable that the number of the shift switching positions included in the target travelling route is small, since a time period until the vehicle reaches the target parking position will be longer as the number of the shift switching positions increases. Meanwhile, in many cases, it is necessary for the vehicle to move to a position relatively far away from the target parking position when the parking assistance processing is executed, if the number of the shift switching positions is small.

In other words, if the vehicle can move in a large area when the parking assistance processing is executed, it is possible to obtain the target travelling route including a small number of the shift switching positions. Hereinafter, the area in which the vehicle can travel (move) while the parking assistance processing is executed is also referred to as a "travelable region." The travelable region differs (varies) for each target parking position, and is determined, for example, according to a width of a road facing the target parking position.

However, according to the conventional apparatus, no consideration is given to obtaining the target travelling route on the basis of the travelable region according to the target parking position.

In view of the forgoing, one object of the present disclosure is to disclose a parking assistance apparatus which can obtain the target travelling route on the basis of the travelable region.

A parking assistance apparatus for achieving the above-described object (hereinafter also referred to as "the apparatus of the present disclosure") comprises a control unit. The control unit may be implemented by at least one programmed processor whose operation is determined by a predetermined program, gate arrays and the like.

The control unit is configured to obtain a "target travelling route" which is a route from a present position of a vehicle to a "target parking position."

In addition, the control unit is configured to execute a "travelling assistance processing" for controlling at least a steering angle of the vehicle such that the vehicle moves along the target travelling route.

Furthermore, the control unit is configured to obtain the target travelling route such that the vehicle is made to move backward to reach the target parking position and the vehicle is made to move in a region on the target parking position side of a "travelling boundary line."

The travelling boundary line is a straight line which is in front of the vehicle located at the target parking position and which is away from a "reference position" by a "boundary distance." The reference position is a position at a front end and at a center in a lateral direction of the vehicle located at the target parking position. The boundary distance is a configurable value changed by a driver of the vehicle and stored in the control unit.

According to the apparatus of the present disclosure, the vehicle moves within a region between the target parking position and the travelling boundary line while the travel assistance processing is executed. In other words, the vehicle does not enter a region opposite to the target parking position with respect to the travelling boundary line. In addition, the driver can change the boundary distance used for determining the travelling boundary line. In other words, the drive can configure the travelling boundary line appropriately corresponding to the target parking position. Accordingly, according to the apparatus of the present disclosure, it is possible to obtain the target travelling route on the basis of the travelable region according to the target parking position.

In one aspect (first aspect) of the apparatus of the present disclosure, the control unit is configured to obtain the travelling boundary line such that the travelling boundary line is parallel to a longitudinal direction of the vehicle located at the present position.

According to the first aspect, it is possible to determine the travelling boundary line by a relatively simple process.

Furthermore, in another aspect (second aspect) of the apparatus of the present disclosure, the control unit is configured to store a plurality of the target parking positions. In addition, the control unit is configured to store the boundary distances corresponding to each of the target parking positions.

In the second aspect, for example, the driver can register a parking lot at his/her home as one of the target parking positions and can register a parking lot at his/her workplace as another target parking position. In addition, the driver can set (configure) the boundary distance for each of the registered target parking positions.

For example, if a width of a road facing the target parking position is narrow, the boundary distance can be set to a small value. Meanwhile, if a traffic volume on the road facing the target parking position is extremely small, the boundary distance can be set to a large value. Therefore, according to the present aspect, the boundary distance can be set to an appropriate value corresponding to each situation of the target parking position.

In still another aspect (third aspect) of the apparatus of the present disclosure, the control unit is configured such that the boundary distance has been set to a maximum value in a range of values to which the boundary distance can be set if the boundary distance has not been changed by the driver.

Namely, an initial value of the boundary distance is set to the maximum value of that boundary distance. When the boundary distance is set to the maximum value, the travelling boundary line is located at a position away from the target parking position (namely, the travelable region is relatively large), and thus, there will be a higher possibility that the number of the shift switching positions included in the target travelling route decreases. Therefore, according to the third aspect, even when the driver does not understand how to set (change) the boundary distance, there will be a higher possibility that a time length required for the vehicle to reach the target parking position by the travel assistance processing is reduced.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION (Configuration)

Figure 1:
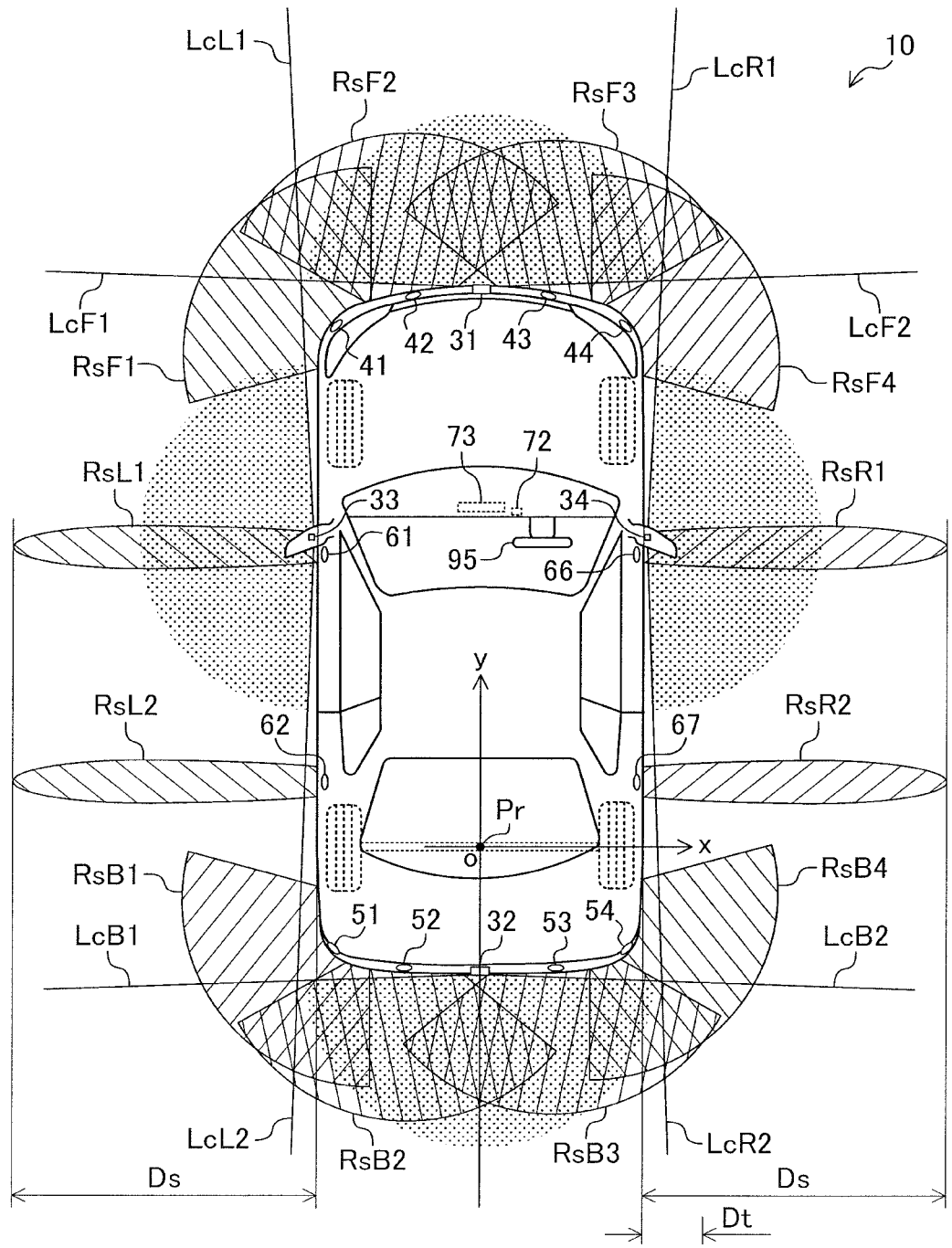
FIG. 1 is a schematic diagram of a vehicle (present vehicle) on which a parking assistance apparatus according to an embodiment of the present disclosure (present assistance apparatus) is mounted.

A parking assistance apparatus according to an embodiment of the present disclosure (hereinafter also referred to as the "present assistance apparatus") will now be described with reference to the drawings. The present assistance apparatus is applied to a vehicle 10 shown in FIG. 1. As understood from FIG. 2 illustrating a block diagram of the present assistance apparatus, the present assistance apparatus includes a drive assistance ECU 21, a drive control ECU 22, a brake control ECU 23, and an EPS-ECU 24 each of which is an electronic control unit (ECU).

The drive assistance ECU 21 includes a micro-computer, as a major component, which is equipped with a CPU, a non-volatile memory, and a RAM. The CPU performs data reading, numerical computation, computation result output, and so on, by repeatedly executing predetermined programs (routines). The non-volatile memory is formed by a rewritable flash memory and stores the programs executed by the CPU, lookup tables (maps) read by the CPU during execution of the programs, and so on. The RAM stores data read by the CPU temporarily.

Each of the drive control ECU 22, the brake control ECU 23 and the EPS-ECU 24 includes a micro-computer as a major component similarly to the drive assistance ECU 21. These ECUs can perform data communication (can exchange data) with one another through a CAN (controller area network) 25.

In addition, each ECU can receive output values of a sensor connected to one of the other ECUs through the CAN 25 from that ECU to which the sensor is connected. For example, a steering angle sensor 92 which is described later is connected to the EPS-ECU 24, and the drive assistance ECU 21 can receive a steering angle θs detected by the steering angle sensor 92 from the EPS-ECU 24 via the CAN 25.

The drive assistance ECU 21 is connected to a front camera 31, a rear camera 32, a left side camera 33, a right side camera 34, a front sonar apparatus 40, a rear sonar apparatus 50, a left side sonar apparatus 60, a right side sonar apparatus 65, a vehicle speed sensor 71, an operation button 72, a display 73, and a speaker 74.

(Configuration—Camera Apparatus)

Figure 2:
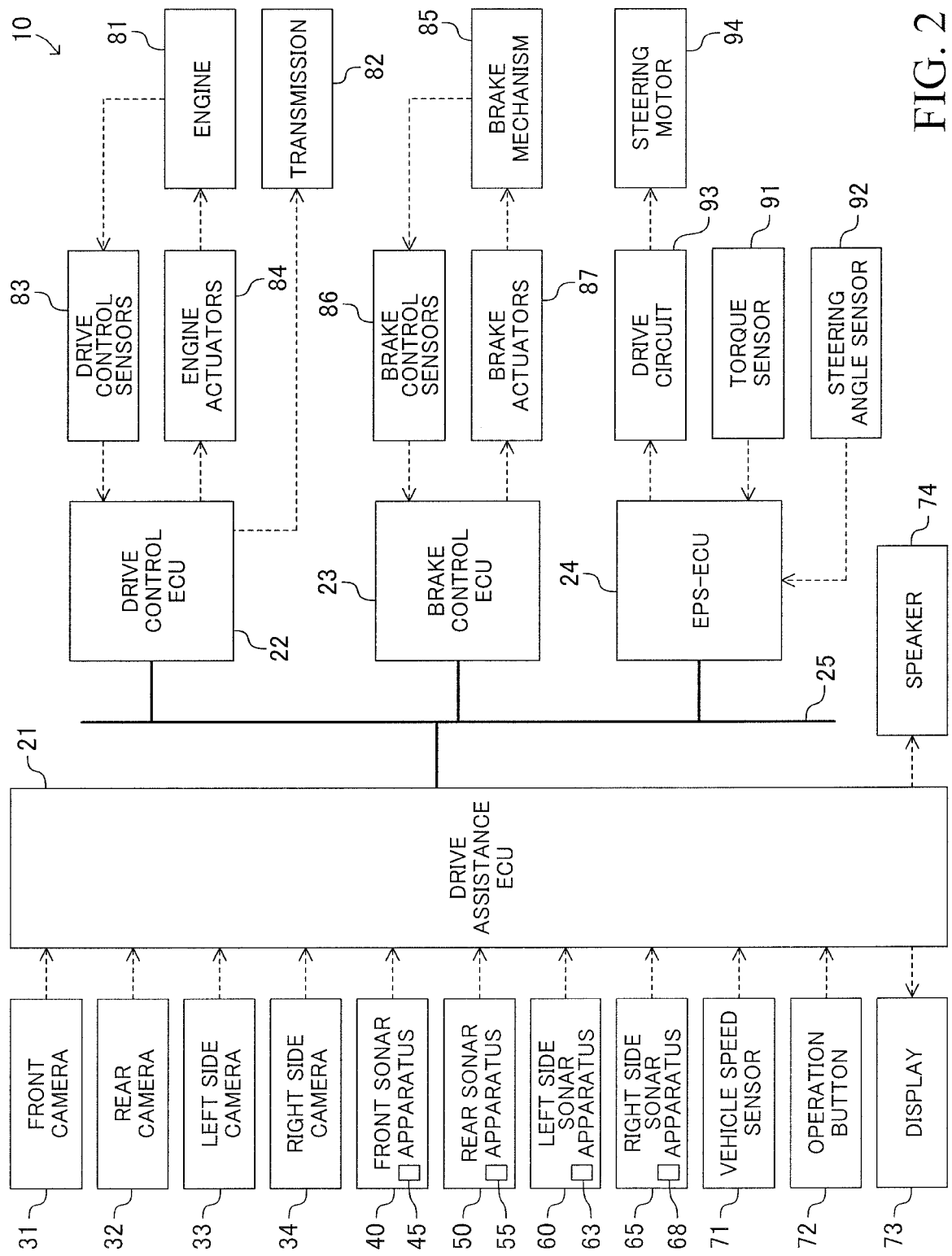
FIG. 2 is a block diagram of the present assistance apparatus.

As shown in FIG. 1, the front camera 31 is disposed at the center of the front end of the vehicle 10. The front camera 31 obtains information (more specifically, static image data) representing a "front image" which is a captured image (picture) of a region in front of the vehicle 10 every time a predetermined time interval ΔTc elapses, and outputs data representing the front image to the drive assistance ECU 21. A captured region (angle of view) of the front camera 31 in the lateral plane is equal to a range between a straight line LcF1 and a straight line LcF2.

The rear camera 32 is disposed at the center of the rear end of the vehicle 10. The rear camera 32 obtains information representing a "rear image" which is a captured image of a region behind the vehicle 10 every time the time interval ΔTc elapses, and outputs data representing the rear image to the drive assistance ECU 21. The captured region (angle of view) of the rear camera 32 in the lateral plane is equal to a range between a straight line LcB1 and a straight line LcB2.

The left side camera 33 is disposed at a position below a left door mirror (side mirror) of the vehicle 10. The left side camera 33 obtains information representing a "left side image" which is a captured image of a region on a left side of the vehicle 10 every time the time interval ΔTc elapses, and outputs data representing the left side image to the drive assistance ECU 21. The captured region (angle of view) of the left side camera 33 in the lateral plane is equal to a range between a straight line LcL1 and a straight line LcL2.

The right side camera 34 is disposed at a position below a right door mirror of the vehicle 10. The right side camera 34 obtains information representing a "right side image" which is a captured image of a region on a right side of the vehicle 10 every time the time interval ΔTc elapses, and outputs data representing the right side image to the drive assistance ECU 21. The captured region (angle of view) of the right side camera 34 in the lateral plane is equal to a range between a straight line LcR1 and a straight line LcR2.

Hereinafter, these images (namely, the front image, the rear image, the left side image and the right side image) obtained by the front camera 31, the rear camera 32, the left side camera 33 and the right side camera 34 may sometimes be referred to as a "surrounding image" collectively.

The drive assistance ECU 21 obtains (estimates) a position (location) of an object contained in the surrounding image with respect to the vehicle 10 on the basis of the position of that object in that surrounding image when that surrounding image is received. Namely, the drive assistance ECU 21 detects an object which is present around the vehicle 10 on the basis of the surrounding image. Hereinafter, the object detected on the basis of the surrounding image may sometimes be referred to as a "camera object."

(Configuration—Sonar Apparatus)

The front sonar apparatus 40 includes a left front corner sonar 41, a left front center sonar 42, a right front center sonar 43, a right front corner sonar 44 and a front sonar control section 45. As shown in FIG. 1, the left front corner sonar 41 is disposed at the left-front corner of the vehicle 10. A region in which the left front corner sonar 41 can detect an object is approximately represented by a region RsF1. The left front center sonar 42 is disposed at the front end of the vehicle 10 and located on the left side of the center. A region in which the left front center sonar 42 can detect an object is approximately represented by a region RsF2.

The right front center sonar 43 is disposed at the front end of the vehicle 10 and located on the right side of the center. A region in which the right front center sonar 43 can detect an object is approximately represented by a region RsF3. The right front corner sonar 44 is disposed at the right-front corner of the vehicle 10. A region in which the right front corner sonar 44 can detect an object is approximately represented by a region RsF4.

Each of the left front corner sonar 41, the left front center sonar 42, the right front center sonar 43 and the right front corner sonar 44 includes a sonar transmission section, and a sonar reception section (both are not shown). Each of the sonar transmission sections transmits an ultrasonic wave as a "sonar transmission wave" in response to an instruction from the front sonar control section 45. When the sonar reception section receives a reflected wave (sonar reflected wave) generated by reflection of the sonar transmission wave at an object, the sonar reception section outputs information about the sonar reflected wave such as the frequency and strength of the sonar reflected wave (sonar reflected wave information) to the front sonar control section 45.

The front sonar control section 45 executes "sonar object detection processing" every time a predetermined time interval ΔTs elapses. The sonar object detection processing is processing to detect an object and to obtain (figure out) the position of the object (relative position with respect to the vehicle 10) and the speed of the object (relative speed with respect to the vehicle 10), on the basis of the sonar reflected wave information sent from the sonar reception sections. When the object is detected by executing the sonar object detection processing, the front sonar control section 45 sends information about the detected object including the position and the speed as "sonar object information" to the drive assistance ECU 21.

The rear sonar apparatus 50 includes a left rear corner sonar 51, a left rear center sonar 52, a right rear center sonar 53, a right rear corner sonar 54, and a rear sonar control section 55. The left rear corner sonar 51 is disposed at the left-rear corner of the vehicle 10. A region in which the left rear corner sonar 51 can detect an object is approximately represented by a region RsB1. The left rear center sonar 52 is disposed at the rear end of the vehicle 10 and located on the left side of the center. A region in which the left rear center sonar 52 can detect an object is approximately represented by a region RsB2.

The right rear center sonar 53 is disposed at the rear end of the vehicle 10 and located on the right side of the center. A region in which the right rear center sonar 53 can detect an object is approximately represented by a region RsB3. The right rear corner sonar 54 is disposed at the right-rear corner of the vehicle 10. A region in which the right rear corner sonar 54 can detect an object is approximately represented by a region RsB4.

Each of the left rear corner sonar 51, the left rear center sonar 52, the right rear center sonar 53 and the right rear corner sonar 54 includes the sonar transmission section and the sonar reception section (both are not shown) similarly to the front sonar apparatus 40. Each of the sonar transmission sections transmits the sonar transmission wave in response to an instruction from the rear sonar control section 55. When the sonar reception section receives the sonar reflected wave, the sonar reception section outputs the sonar reflected wave information to the rear sonar control section 55.

The rear sonar control section 55 executes the sonar object detection processing every time the time interval ΔTs elapses. When the object is detected by executing the sonar object detection processing, the rear sonar control section 55 sends the sonar object information to the drive assistance ECU 21.

The left side sonar apparatus 60 includes a left side front sonar 61, a left side rear sonar 62, and a left side sonar control section 63. The left side front sonar 61 is disposed at a position closer to the front end and on the left side of a vehicle body of the vehicle 10. A region in which the left side front sonar 61 can detect an object is approximately represented by a region RsL1. The left side rear sonar 62 is disposed at a position closer to the rear end and on the left side of the vehicle body of the vehicle 10. A region in which the left side rear sonar 62 can detect an object is approximately represented by a region RsL2.

As understood from FIG. 1, the left side sonar apparatus 60 can detect the object that is present within a detection distance Ds from the left end of the vehicle body of the vehicle 10.

Each of the left side front sonar 61 and the left side rear sonar 62 includes the sonar transmission section and the sonar reception section (both are not shown) similarly to the front sonar apparatus 40. Each of the sonar transmission sections transmits the sonar transmission wave in response to an instruction from the left side sonar control section 63. When the sonar reception section receives the sonar reflected wave, the sonar reception section outputs the sonar reflected wave information to the left side sonar control section 63.

The left side sonar control section 63 executes the sonar object detection processing every time the time interval ΔTs elapses. When the object is detected by executing the sonar object detection processing, the left side sonar control section 63 sends the sonar object information to the drive assistance ECU 21.

The right side sonar apparatus 65 includes a right side front sonar 66, a right side rear sonar 67, and a right side sonar control section 68. The right side front sonar 66 is disposed at a position closer to the front end and on the right side of the vehicle body of the vehicle 10. A region in which the right side front sonar 66 can detect an object is approximately represented by a region RsR1. The right side rear sonar 67 is disposed at a position closer to the rear end and on the right side of the vehicle body of the vehicle 10. A region in which the right side rear sonar 67 can detect an object is approximately represented by a region RsR2.

The right side sonar apparatus 65 can detect the object that is present within a detection distance Ds from the right end of the vehicle body of the vehicle 10 similarly to the left side sonar apparatus 60.

Each of the right side front sonar 66 and the right side rear sonar 67 includes the sonar transmission section and the sonar reception section (both are not shown) similarly to the front sonar apparatus 40. Each of the sonar transmission sections transmits the sonar transmission wave in response to an instruction from the right side sonar control section 68. When the sonar reception section receives the sonar reflected wave, the sonar reception section outputs the sonar reflected wave information to the right side sonar control section 68.

The right side sonar control section 68 executes the sonar object detection processing every time the time interval ΔTs elapses. When the object is detected by executing the sonar object detection processing, the right side sonar control section 68 sends the sonar object information to the drive assistance ECU 21.

Hereinafter, the object detected by each of the front sonar apparatus 40, the rear sonar apparatus 50, the left side sonar apparatus 60 and the right side sonar apparatus 65 may sometimes be referred to as a "sonar object."

(Configuration—Others)

The vehicle speed sensor 71 detects a vehicle speed Vt which is a speed of the vehicle 10 and output a signal indicative of the vehicle speed Vt to the drive assistance ECU 21.

The operation button 72 is a push button switch arranged in a vehicle compartment of the vehicle 10 and within a reach of a driver of the vehicle 10. The operation button 72 outputs a signal indicating whether or not the operation button 72 is being pressed to the drive assistance ECU 21.

Hereinafter, a series of operations from a start of pressing the operation button 72 to an end of pressing the operation button 72 is referred to as "parking assistance starting operation." The driver of the vehicle 10 performs the parking assistance starting operation in order to make (let) the drive assistance ECU 21 start "parking assistance processing."

The display 73 is an LCD (liquid crystal display) placed at an appropriate position in the vehicle compartment so that the driver can view the display 73. Characters, figures, and the like to be displayed on the display 73 are controlled by the drive assistance ECU 21.

In addition, the display 73 also functions as a touch panel. Specifically, when the driver touches the display 73, the display 73 outputs information regarding a position touched by the driver to the drive assistance ECU 21. Accordingly, the driver can provide (send) an instruction to the drive assistance ECU 21 by touching the display 73.

The speaker 74 is disposed in the vehicle compartment of the vehicle 10. A warning sound, a voice message and the like to be played by the speaker 74 are controlled by the drive assistance ECU 21.

(Control of Drive Force)

The drive control ECU 22 controls an engine 81 and a transmission 82 so as to adjust (control) a drive force of the vehicle 10 (see FIG. 2). The drive control ECU 22 is connected to a plurality of drive control sensors 83 and receives detection signals from these sensors. The drive control sensors 83 are sensors for detecting operation state quantities (parameters) of the engine 81, and operation states of the driver related to the drive force control. The drive control sensors 83 include an accelerator pedal operation amount (depression amount) sensor, a shift position sensor which detects an operation status of a shift lever, a throttle valve opening sensor, an engine rotational speed sensor, an intake air amount sensor. The drive control ECU 22 determines a required drive torque Dreq which is a required value of a drive torque Dd described later, on the basis of the vehicle speed Vt and output values of the drive control sensors 83.

In addition, the drive control ECU 22 is connected to engine actuators 84 including a throttle valve actuator, and a fuel injection valve, and controls the engine actuators 84 so as to control a torque generated by the engine 81. The drive control ECU 22 controls the engine actuators 84 and the transmission 82 such that the "drive torque Dd which is a torque transmitted to drive wheels of the vehicle 10" coincides with the required drive torque Dreq, to thereby control an acceleration As which is a change amount of the vehicle speed Vt per unit time.

Furthermore, the drive control ECU 22 switches shift modes of the transmission 82 in response to the operation to the shift lever by the driver. The shift modes include a "forward mode," a "reverse (backward) mode," a "neutral mode," and a "parking mode." When the shift mode is the forward mode, the vehicle 10 moves forward by the drive force of the engine 81. When the shift mode is the reverse mode, the vehicle 10 moves backward by the drive force of the engine 81.

When the shift mode is the neutral mode, the drive force is not transmitted to the drive wheels of the vehicle 10. When the shift mode is the parking mode, a lock mechanism (not shown) that prevents rotation of the drive wheels of the vehicle 10 is in operation.

Furthermore, when the drive control ECU 22 receives a "drive force control request" including a target drive force Ddtg from the drive assistance ECU 21, the drive control ECU 22 controls the engine actuators 84 and the transmission 82 such that the actual value of the drive torque Dd coincides with the target drive force Ddtg. In addition, when the drive control ECU 22 receives a "shift change request" including a "target shift mode" from the drive assistance ECU 21, the drive control ECU 22 controls the transmission 82 such that the actual shift mode coincides with the target shift mode.

(Control of Brake Force)

The brake control ECU 23 controls a brake mechanism 85 which is formed by a hydraulic friction brake apparatus installed on the vehicle 10. The brake control ECU 23 is connected to a plurality of brake control sensors 86 and receives detection signals from these sensors. The brake control sensors 86 are sensors for detecting state quantities used for controlling the brake mechanism 85, and operation state of the driver related to the brake force control. The brake control sensors 86 include an operation amount sensor for detecting the operation amount of a brake pedal, pressure sensors of brake oil applied to the brake mechanism 85, and so on. The brake control ECU 23 determines a required brake force Breq which is a required value of a brake force Bf described later, on the basis of the vehicle speed Vt and output values of the brake control sensors 86.

In addition, the brake control ECU 23 is connected to a plurality of brake actuators 87 which are hydraulic actuators of the brake mechanism 85. The brake control ECU 23 controls the brake actuators 87 such that "the actual value of the brake force Bf which is a total force of a frictional brake force applied to each of wheels" coincides with the required brake force Breq so as to control the acceleration As (in this case, negative acceleration; namely, deceleration).

Furthermore, when the brake control ECU 23 receives a "brake force control request" including a target brake force Bftg from the drive assistance ECU 21, the brake control ECU 23 controls the brake actuators 87 such that the actual value of the brake force Bf coincides with the target brake force Bftg.

(Control of Assist Torque and Steering Angle)

The EPS-ECU 24 is connected to a torque sensor 91 and the steering angle sensor 92 and receives detection signals from these sensors. The torque sensor 91 detects a steering torque Tw which is a torque added to a steering wheel 95 (see FIG. 1) by the driver and outputs a signal indicative of the steering torque Tw. The steering angle sensor 92 detects the steering angle θs which is a rotational angle of the steering wheel 95 and outputs a signal indicative of the steering angle θs.

The EPS-ECU 24 determines a target assist torque Tatg which is a target value of a torque (assist torque) to assist operation to the steering wheel 95 by the driver, on the basis of the vehicle speed Vt, the steering torque Tw and the steering angle θs and so on.

The EPS-ECU 24 is connected to a drive circuit 93. The drive circuit 93 supplies electrical power to a steering motor 94. The steering motor 94 generates a torque Tm which rotates a steering shaft connected to the steering wheel 95. The EPS-ECU 24 controls the drive circuit 93 such that the actual value of the torque Tm coincides with the target assist torque Tatg.

Furthermore, when the EPS-ECU 24 receives a "steering angle control request" including a target steering angle θstg from the drive assistance ECU 21, the EPS-ECU 24 controls the steering motor 94 such that the actual value of the steering angle θs coincides with the target steering angle θstg.

(Parking Assistance Processing)

When the driver of the vehicle 10 performs the parking assistance starting operation to the operation button 72, the drive assistance ECU 21 starts the parking assistance processing. The parking assistance processing is processing to assist the driver to park the vehicle 10 to a "target parking position." In the present embodiment, the vehicle 10 moves (travels) backward to reach to the target parking position when the parking assistance processing is being executed.

The driver can register (store) up to three (at largest) target parking positions in the drive assistance ECU 21. Specifically, the driver can register the target parking position as any one of "Parking Position 1," "Parking Position 2," and "Parking Position 3." When the parking assistance starting operation is performed while the vehicle 10 is located at a position near any one of the registered target parking positions, the drive assistance ECU 21 obtains a position of that target parking position with respect to a present (current) position of the vehicle 10 and moves (lets) the vehicle 10 reach that target parking position.

Meanwhile, when the parking assistance starting operation is performed, while the target parking position has not been registered or the vehicle 10 is located at a position far away from any of the registered target parking positions, the drive assistance ECU 21 detects a parking section (a parking lot/slot) as a target parking position and moves (lets) the vehicle 10 reach that target parking position.

The parking assistance processing includes a "route obtaining processing" and a "travelling assistance processing." The route obtaining processing is processing for specifying (identifying) the target parking position with respect to the present (current) position of the vehicle 10 and for obtaining (calculating) a "target travelling route (path)" which is a route from the present position of the vehicle 10 to the target parking position. The travelling assistance processing is processing for making (letting) the vehicle 10 travel (run/move) along/on the target travelling route.

In the following description of the parking assistance processing, the center point of a wheel axis of rear wheels of the vehicle 10 in a lateral direction shown in FIG. 1 is referred to as a reference point Pr. In addition, an X-Y coordinate system whose origin is the reference point Pr is defined (introduced). An axis which extends in the lateral direction (width direction) of the vehicle 10 is an X coordinate axis, and an axis which extends in a longitudinal direction of the vehicle 10 is a Y coordinate axis. Therefore, the X coordinate axis and the Y coordinate axis are orthogonal to each other. The X coordinate assumes a positive value on the right side with respect to the heading direction of the vehicle 10 moving forward and assumes a negative value on the left side with respect to the heading direction of the vehicle 10 moving forward. The Y coordinate assumes a positive value on one side of the origin toward the forward direction of the vehicle 10 and assumes a negative value on the other side of the origin toward the backward direction of the vehicle 10.

When the driver performs a predetermined operation to cause the drive assistance ECU 21 to execute a "parking position registering processing" in order to register the target parking position (namely, any one of "Parking Position 1," "Parking Position 2," and "Parking Position 3"), the drive assistance ECU 21 stores a plurality of "characteristic points" related to (or to specify) the target parking position in the non-volatile memory. In the present embodiment, each of the characteristic points is a square shaped area (namely, a part of an image) including a predetermined number of pixels.

When the parking position registering processing is being executed, the drive assistance ECU 21 generates (obtains), on the basis of the surrounding images, an "overhead image" which is the substantially same image as an image (bird's-eye view image) obtained by photographing the vehicle 10 and the surrounding of the vehicle 10 from above. The drive assistance ECU 21 extracts the characteristic points from the overhead image, and stores those characteristic points in the non-volatile memory with positions (namely, X coordinate values and Y coordinate values) with respect to the reference point Pr in a case where the vehicle 10 is (imaginally/hypothetically) positioned at the target parking position.

When the parking assistance processing (specifically, the route obtaining processing) is started, the drive assistance ECU 21 searches (looks) for the characteristic points that are contained in the present/current overhead image (specifically, the overhead image obtained on the basis of the present/current surrounding images) by means of a well-known template matching method in order to specify (identify) the target parking position. When a sufficient number of the characteristic points are detected, the drive assistance ECU 21 specifies the target parking position with respect to the present position of the vehicle 10. More specifically, the drive assistance ECU 21 obtains the followings (a) to (c) for extracted parking section.

(a) A distance between a position Prtgt and a position Prnow. The position Prtgt is a position of "the reference point Pr of the vehicle 10 located at the target parking position". In other words, the position Prtgt means a position of the reference point Pr of when the vehicle 10 is hypothetically/virtually parked at the target parking position. The position Prnow is a position of "the reference point Pr of the vehicle 10 that is at the present position."

(b) A direction of the position Prtgt with respect to the position Prnow.

(c) A yaw angle difference that is a difference between a yaw angle (namely, a direction of the longitudinal axis) of the vehicle 10 of when the vehicle 10 is located at the present position and the yaw angle of the vehicle 10 of when the vehicle 10 is hypothetically/virtually at the target parking position.

Meanwhile, if a sufficient number of the characteristic points are not detected, the drive assistance ECU 21 extracts (recognizes) a road surface marking (for example, a white line indicating a parking section (a parking lot/slot)) contained in the overhead image and treats (regards) the extracted parking section as the target parking position. In this case, the drive assistance ECU 21 obtains the above-described (a) to (c).

Figure 3A:
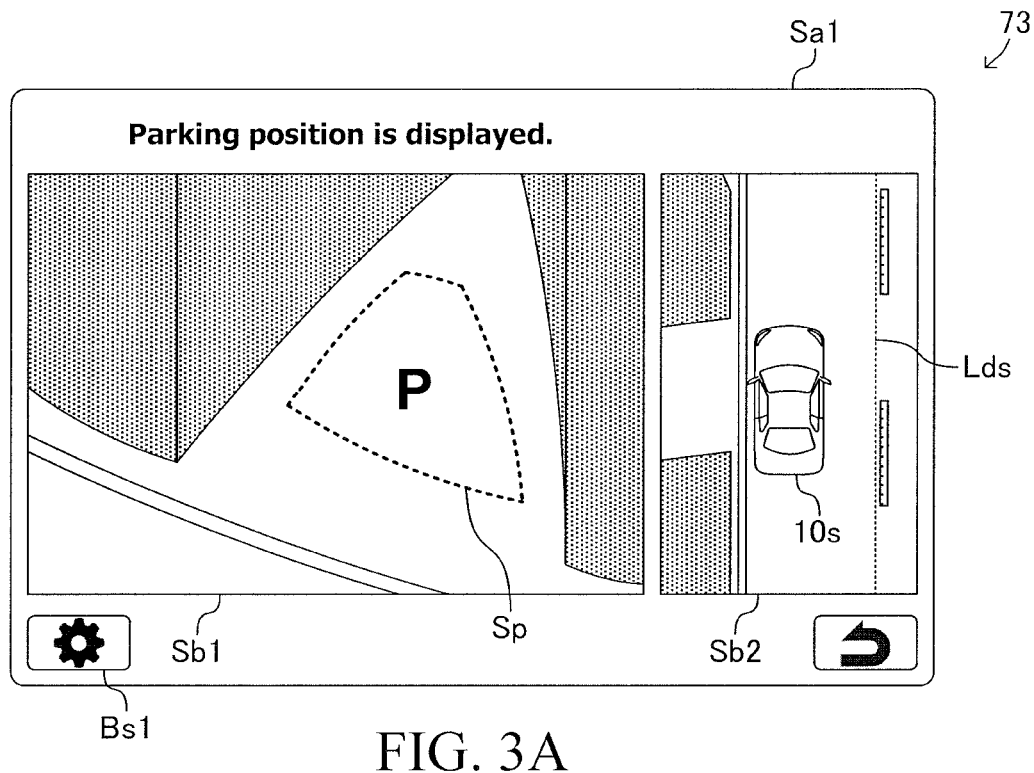
FIG. 3A is a diagram indicating a parking assistance screen which is displayed on a display of the present assistance apparatus when a route obtaining processing is started.

In addition, the drive assistance ECU 21 displays a parking assistance screen Sa1 exemplified in FIG. 3A on the display 73. The parking assistance screen Sa1 includes a left sub screen Sb1 and a right sub screen Sb2. In the left sub screen Sb1, a part of the surrounding image including the specified target parking position and a region around that target parking position is displayed. A parking region (parking space, parking lot) Sp contained in the left sub screen Sb1 indicates the specified target parking position. In the right sub screen Sb2, a vehicle symbol 10s representing the vehicle 10 and the overhead image are displayed. A dashed line Lds contained in the right sub screen Sb2 is a straight line corresponding to a travelling boundary line (a dash-dot-dash line Ld1) described later.

Notably, since processing for storing the characteristic points and for obtaining the positional relation (e.g., the above-described (a) to (c)) between the present position and the target parking position on the basis of the stored characteristic point is well-known, detailed explanation is omitted (see, for example, Japanese Patent Application Laid-Open (kokai) Nos. 2017-21427, 2017-138664 and 2018-127065).

Figure 4:
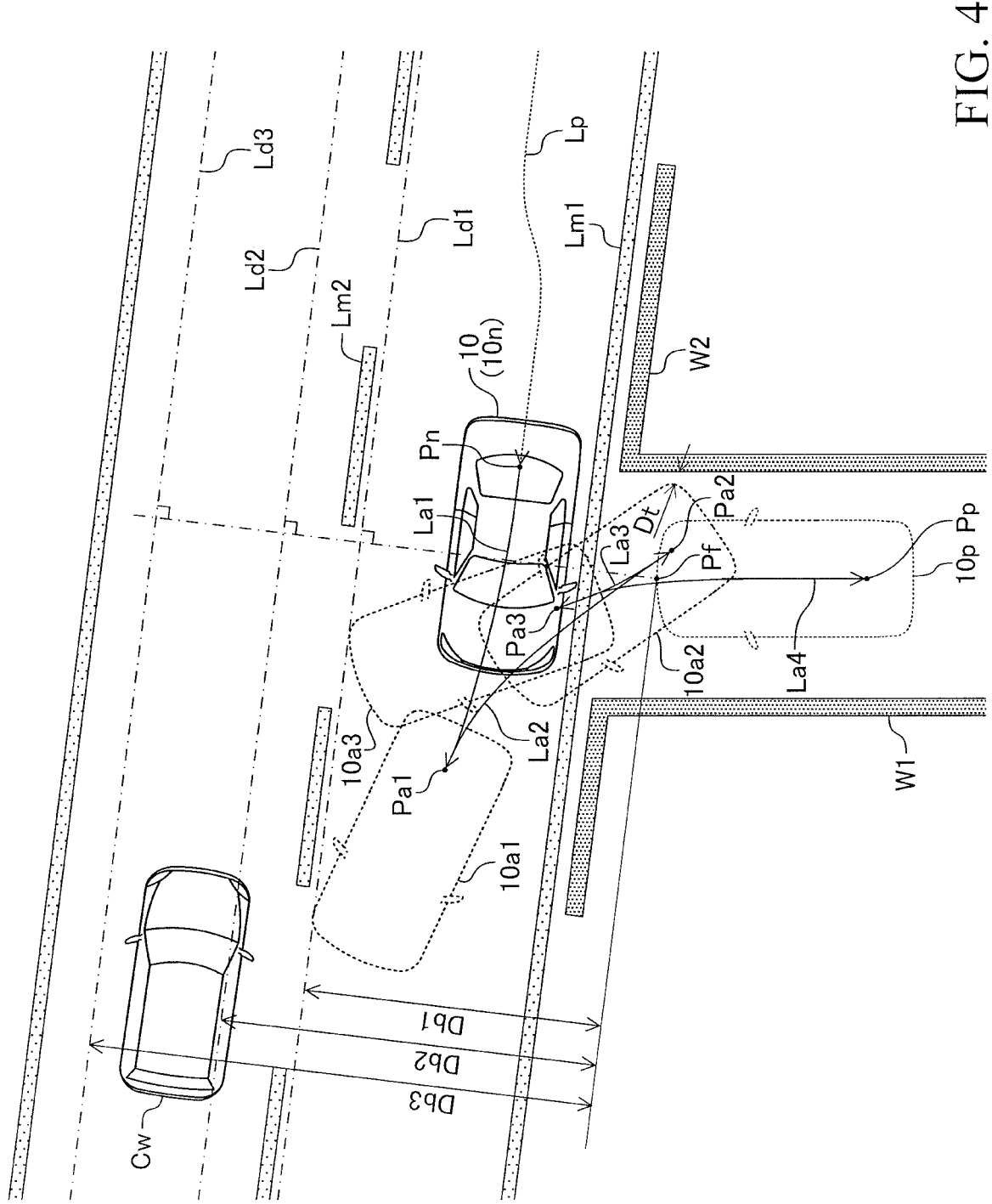
FIG. 4 is an example of a target travelling route from the present position of the present vehicle to a target parking position.

The target travelling route obtained by executing the route obtaining processing will be specifically described with reference to an example shown in FIG. 4. A point Pn shown in FIG. 4 represents the reference point Pr of the vehicle 10 of when the parking assistance starting operation is performed. A position of the vehicle 10 at this point in time may be referred to as a vehicle position 10n. A dashed line Lp indicates a locus (namely, a route along/on which the vehicle 10 has already traveled) of the reference point Pr until the reference point Pr reaches the point Pn.

In the present example, the target parking position is a parking section (parking lot) which has been registered as "Parking Position 1" described later. A vehicle position 10p indicates the target parking position (namely, the vehicle 10 parked at the target parking position). A point Pp indicates the reference point Pr of the vehicle 10 parked at the target parking position. A wall surface W1 and a wall surface W2 indicate wall surfaces around the target parking position.

The drive assistance ECU 21 determines the travelling boundary line when the route obtainment processing is executed. In FIG. 4, the travelling boundary line is represented by the dash-dot-dash line Ld1. In addition, the drive assistance ECU 21 obtains the target travelling route such that the vehicle 10 does not enter a region opposite to the vehicle position 10p with respect to the travelling boundary line while the vehicle 10 moves along that target travelling route.

Furthermore, the drive assistance ECU 21 obtains the target travelling route such that a distance between an object around the vehicle 10 and the vehicle 10 is kept larger than a predetermined threshold distance Dt while the vehicle 10 moves along that target travelling route (see FIG. 1, and the distance between the wall surface W2 and a vehicle position 10a2 described later in FIG. 4).

The dash-dot-dash line Ld1 (namely, the travelling boundary line) is a straight line parallel to a longitudinal direction of the vehicle position 10n (namely, the vehicle 10 at a point in time when the route obtainment processing is performed). In addition, a distance between the dash-dot-dash line Ld1 and a point Pf (hereinafter also referred to as a "reference point" for convenience' sake) which is at a front end and a center in a lateral direction of the vehicle position 10p (namely, the vehicle 10 located at the target parking position) is a boundary distance Db1. As described later, the driver can change (set) the distance (in the present example, the boundary distance Db1) between the reference position and the travelling boundary line.

In the present example, the target travelling route is represented by a curved line La1 from the point Pn to a point Pa1, a curved line La2 from the point Pa1 to a point Pa2, a curved line La3 from the point Pa2 to a point Pa3, and a curved line La4 from the point Pa3 to the point Pp. The sections (paths) represented by the curved line La1 and the curved line La3 are sections along which the vehicle 10 moves (travels) forward. The sections (paths) represented by the curved line La2 and the curved line La4 are sections along which the vehicle 10 moves (travels) backward.

A vehicle position 10a1 indicates a position of the vehicle 10 at a point in time when the vehicle 10 reaches an end point (namely, the point Pa1) of the section represented by the curved line La1. A vehicle position 10a2 indicates a position of the vehicle 10 at a point in time when the vehicle 10 reaches an end point (namely, the point Pa2) of the section represented by the curved line La2. A vehicle position 10a3 indicates a position of the vehicle 10 at a point in time when the vehicle 10 reaches an end point (namely, the point Pa3) of the section represented by the curved line La3.

Figure 3B:
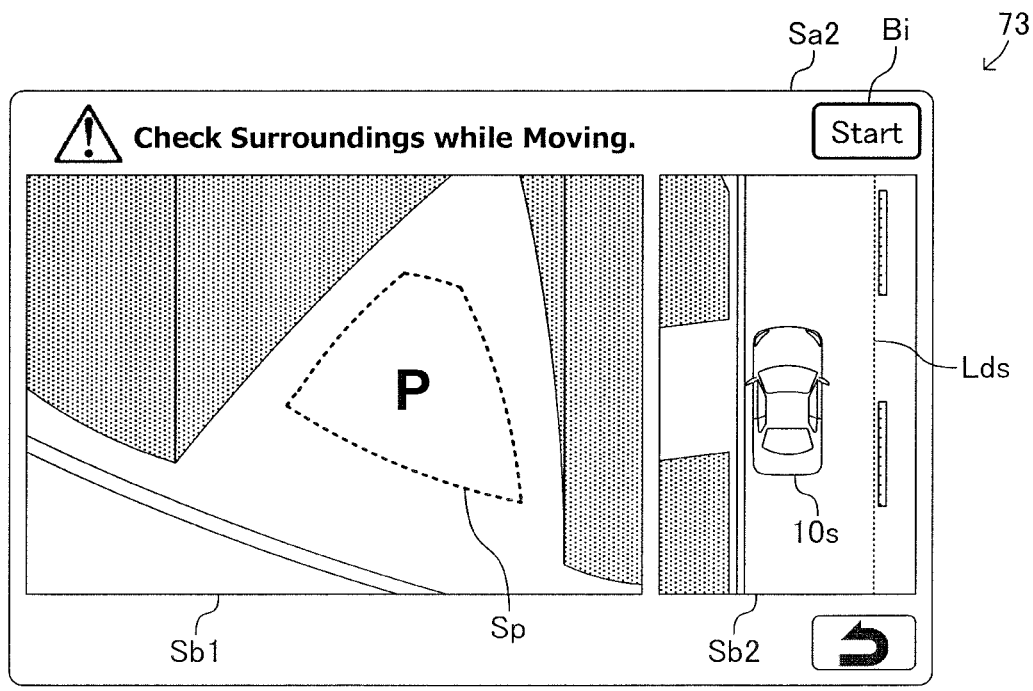
FIG. 3B is a diagram indicating another parking assistance screen displayed when a target travelling route is obtained by the route obtaining processing.

When the target travelling route is obtained, the drive assistance ECU 21 displays, instead of the parking assistance screen Sa1, a parking assistance screen Sa2 shown in FIG. 3B on the display 73. The parking assistance screen Sa2 includes a start button Bi.

When the driver performs an operation (hereinafter also referred to as a "travel starting operation") of touching the start button Bi displayed on the display 73 (namely, the driver performs a tapping operation to the start button Bi), while the start button Bi of the parking assistance screen Sa2 is displayed on the display 73, the drive assistance ECU 21 starts the travelling assistance processing.

When the travel starting operation is performed (namely, the travelling assistance processing is started), the drive assistance ECU 21 ends the display of the start button Bi in the parking assistance screen Sa2. Namely, the start button Bi in the parking assistance screen Sa2 disappears.

When the travelling assistance processing is started and the vehicle 10 starts travelling (moving) along the section represented by the curved line La1, the drive assistance ECU 21 controls the drive control ECU 22 such that the shift mode is changed to the forward mode. Namely, the drive assistance ECU 21 sends the shift change request requiring that the target shift mode be the forward mode.

The drive assistance ECU 21 stops the vehicle 10 at the point Pa1 after the vehicle 10 started to move. More specifically, when the vehicle 10 approaches the point Pa1, the drive assistance ECU 21 obtains (figures out) the target brake force Bftg that is required to stop the vehicle 10. In addition, the drive assistance ECU 21 sends, to the brake control ECU 23, the brake force control request including that target brake force Bftg. Substantially, the drive assistance ECU 21 controls the drive control ECU 22 such that the shift mode is changed to the backward mode, and then makes the vehicle 10 move along the path represented by the curved line La2.

While the travelling assistance processing is being executed so as to cause the vehicle 10 to move along the target travelling route, the drive assistance ECU 21 controls the drive control ECU 22 such that the vehicle speed Vt coincides with a predetermined route travelling speed Vr. Specifically, the drive assistance ECU 21 executes processing for sending, to the drive control ECU 22, the drive force control request including the target drive force Ddtg at a predetermined time interval.

At this time, the drive assistance ECU 21 obtains (figures out) a target acceleration Astg such that the vehicle speed Vt coincides with the route travelling speed Vr. In addition, the drive assistance ECU 21 obtains (figures out) the target drive force Ddtg such that the acceleration As coincides with the target acceleration Astg.

Furthermore, while the travelling assistance processing is being executed, the drive assistance ECU 21 controls the steering angle θs such that the vehicle 10 travels (moves) along the target travelling route. Specifically, the drive assistance ECU 21 executes processing for sending, to the EPS-ECU 24, the steering angle control request including the target steering angle θstg at a predetermined time interval.

At this time, the drive assistance ECU 21 obtains a difference (namely, an amount of deviation from the target travelling route) between the present position of the vehicle 10 and the target travelling route (in the width direction of the vehicle 10), and obtains (figures out) the target steering angle θstg on the basis of the difference. The drive assistance ECU 21 obtains (estimates) the present position of the vehicle 10 with respect to the target travelling route on the basis of a history (record) of the vehicle speed Vt and the steering angle θs. In addition, the drive assistance ECU 21 corrects (modifies) the present position of the vehicle 10 with respect to the target travelling route, when a sufficient number of the characteristic points contained in the surrounding image are found (namely, when the present position of the vehicle 10 with respect to the target parking position is accurately obtained on the basis of the characteristic points).

Thereafter, the drive assistance ECU 21 stops at the point Pa2 and switches the shift mode from the backward mode to the forward mode. The vehicle 10 moves along the sections represented by the curved line La3 and the curved line La4 by these processes executed repeatedly. When the vehicle 10 reaches the vehicle position 10p (namely, target parking position), the drive assistance ECU 21 switches the shift mode to the parking mode so as to finish the travelling assistance processing. Namely, the drive assistance ECU 21 finishes the parking assistance processing.

Incidentally, as understood from the vehicle position 10a1 and the vehicle position 10a3, the vehicle 10 does not enter a region opposite to the vehicle position 10p (namely, the target parking position) with respect to the dash-dot-dash line Ld1 while the vehicle 10 moves along that target travelling route. In other words, a part of or all of the vehicle body of the vehicle 10 does not exceed the dash-dot-dash line Ld1 on the sheet of FIG. 4. Accordingly, a collision between the vehicle 10 and another vehicle (for example, an other vehicle Cw shown in FIG. 4) travelling in an opposite lane (namely, a traffic lane opposite to the lane in which the vehicle 10 is travelling) while the vehicle 10 moves along the target travelling route can be avoided. In other words, in the present example, the travelling boundary line according to the target parking position is obtained (determined) appropriately.

Figure 5:
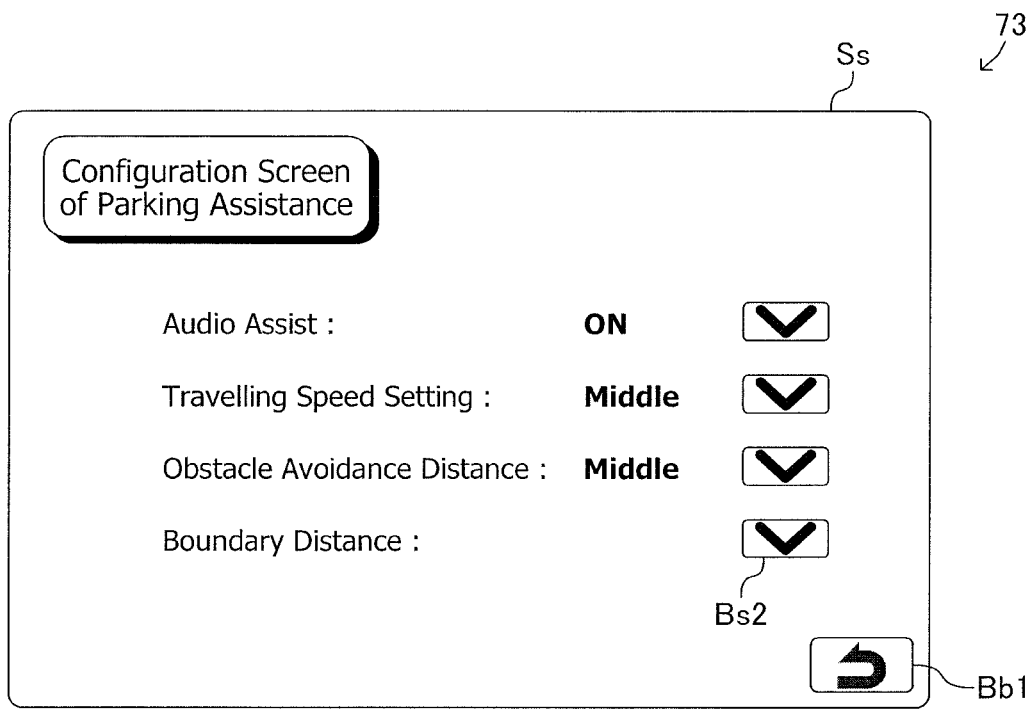
FIG. 5 is a diagram indicating a configuration screen of a parking assistance processing which is displayed on the display of the present assistance.

A procedure for changing the boundary distance (namely, the position of the travelling boundary line) will be described. When the driver performs the tapping operation to a configuration button Bs1 (namely, the driver performs an operation of touching the configuration button Bs1 displayed on the display 73), the drive assistance ECU 21 displays a configuration screen Ss shown in FIG. 5 on the display 73 which is a configuration screen of the parking assistance processing (parking assistance function). On the configuration screen Ss, setting states related to the parking assistance processing are displayed.

The configuration screen Ss includes a configuration button Bs2 related to the boundary distance. When the driver performs the tapping operation to the configuration button Bs2, the drive assistance ECU 21 displays a configuration screen Sr shown in FIG. 6 on the display 73 which is a configuration screen of the boundary distance.

Figure 6:
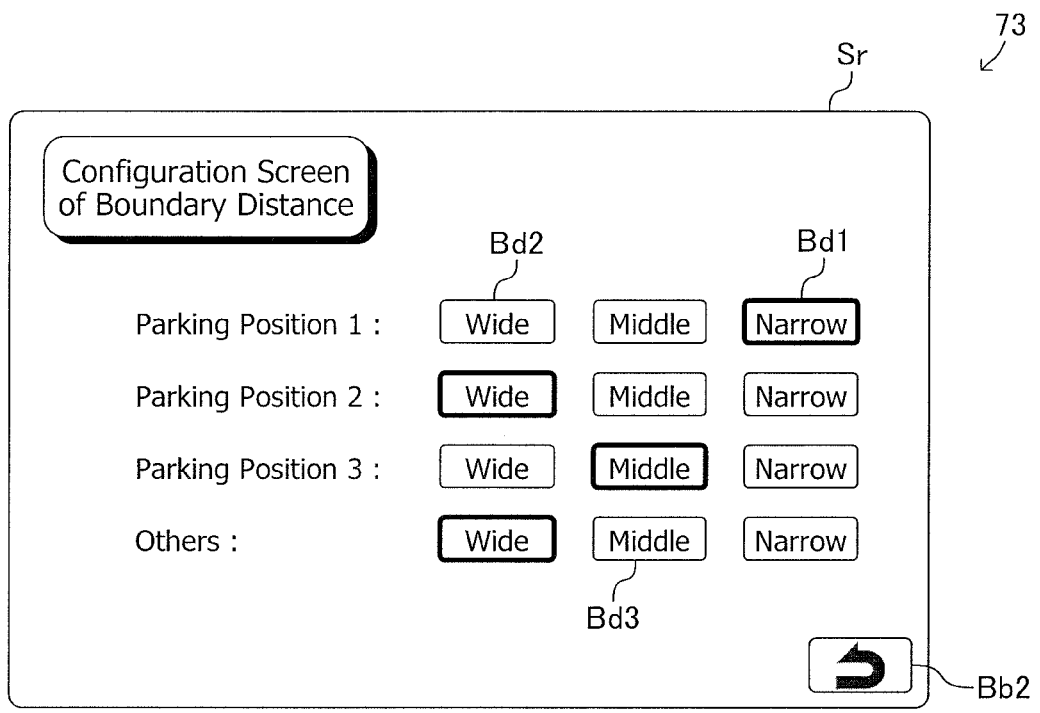
FIG. 6 is a diagram indicating a configuration screen of a boundary distance which is displayed on the display of the present assistance.

As understood from FIG. 6, the driver can set (change) the boundary distance for each of the "Parking Position 1," "Parking Position 2," "Parking Position 3," and "Others" by using the configuration screen Sr. Each of the "Parking Position 1," the "Parking Position 2," and the "Parking Position 3" is related to the target parking positions which have been registered in the drive assistance ECU 21. When the parking assistance processing is executed while no target parking position is registered or the vehicle 10 is far away from the registered target parking positions (namely, when the parking assistance processing is executed for the target parking position which is not registered in the drive assistance ECU 21), the boundary distance registered for "Others" is used.

The boundary distance can be set to any one of "wide," "middle," and "narrow." An initial value of the boundary distance is the "wide." Namely, the boundary distances for each of the "Parking Position 1," the "Parking Position 2," the "Parking Position 3" and the "Others" are set to the "wide," if they have not been set (changed) by the driver. In other words, the boundary distance is a configurable value changed by a driver.

When the boundary distance is set to the "narrow," the distance between the reference position and the travelling boundary line is the boundary distance Db1. When the boundary distance is set to the "middle," the distance between the reference position and the travelling boundary line is a boundary distance Db2 which is longer than the boundary distance Db1. When the boundary distance is set to the "wide," the distance between the reference position and the travelling boundary line is a boundary distance Db3 which is longer than the boundary distance Db2 (namely, Db1<Db2<Db3). In other words, the boundary distance Db3 is the maximum value in a range of values to which the boundary distance can be set.

Accordingly, if the boundary distance is set to the "middle," the travelling boundary line is represented by a dash-dot-dash line Ld2 in FIG. 4. In addition, if the boundary distance is set to the "wide," the travelling boundary line is represented by a dash-dot-dash line Ld3 in FIG. 4.

The driver can set (change) the boundary distance by performing the tapping operation to any one of buttons corresponding to the "wide," "middle," and "narrow" included in the configuration screen Sr. In the configuration screen Sr, an outline of the button corresponding to the current setting is indicated by a bold (thick) line.

For example, the boundary distance corresponding to the "Parking Position 1" has been set to the "narrow," and thus, the outline of a button Bd1 corresponding to the "narrow" of the "Parking Position 1" is a bold line. In this case, when the driver performs the tapping operation to a button Bd2, the boundary distance corresponding to the "Parking Position 1" is set (changed) to the "wide." Meanwhile, when the driver performs the tapping operation to a button Bd3, the boundary distance corresponding to the "Others" is set to the "middle."

When the driver performs the tapping operation to a return button Bb2 included in the configuration screen Sr, the drive assistance ECU 21 displays the configuration screen Ss on the display 73. When the driver performs the tapping operation to a return button Bb1 included in the configuration screen Ss, the drive assistance ECU 21 displays the parking assistance screen Sa1 on the display 73.

Figure 7:
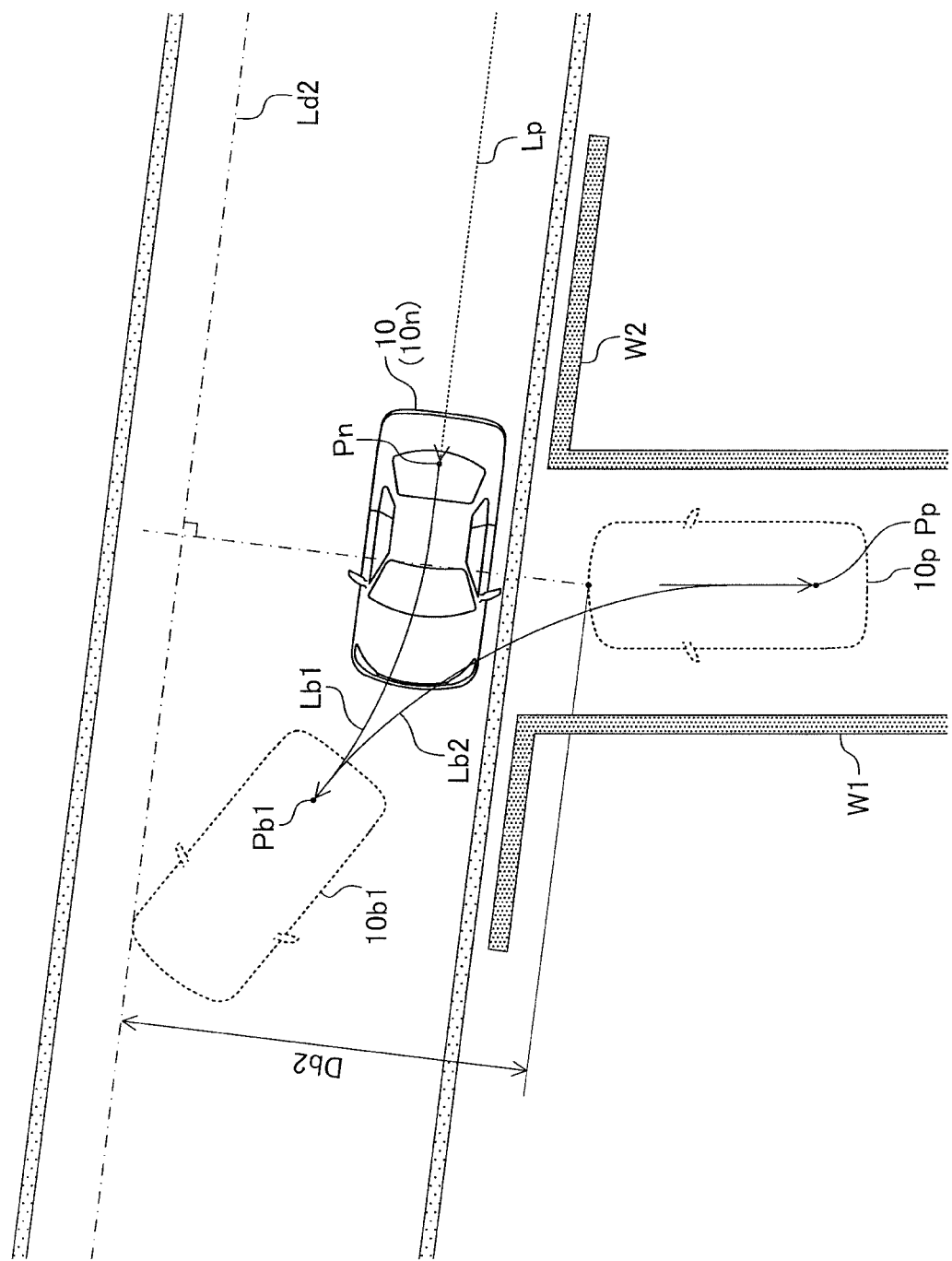
FIG. 7 is an example of a target travelling route from the present position of the present vehicle to the target parking position in a case where a boundary distance has been changed.

In the example shown in FIG. 4 described above, the boundary distance corresponding to the "Parking Position 1" is set to the "narrow." Accordingly, a collision between the vehicle 10 and another vehicle travelling in the opposite lane (namely, an oncoming vehicle) while the vehicle 10 moves along the target travelling route can be avoided. Supposing that a road facing the "Parking Position 1" is a one-way road as shown in FIG. 7, the vehicle 10 will not collide with the oncoming vehicle when the vehicle 10 moves along the target travelling route. Therefore, in this case, it is preferable that the boundary distance corresponding to the "Parking Position 1" is set to the "middle."

In the example shown in FIG. 7, the boundary distance is set to the "middle," and thus, the travelling boundary line is represented by the dash-dot-dash line Ld2. In the present example, the target travelling route is represented by a curved line Lb1 from the point Pn to a point Pb1, and a curved line Lb2 from the point Pb1 to the point Pp. The section (path) represented by the curved line Lb1 is a section along which the vehicle 10 moves forward, and, the section (path) represented by the curved line Lb2 is a section along which the vehicle 10 moves backward. A vehicle position 10b1 indicates a position of the vehicle 10 at a point in time when the vehicle 10 reaches an end point (namely the point Pb1) of the section represented by the curved line Lb1.

As understood from FIGS. 4 and 7, the number of the shift switching positions (namely, positions at which the shift mode of the vehicle 10 is switched between the forward mode and the backward mode) included in the target travelling route decreases by switching the boundary distance from the "narrow" to the "middle" Accordingly, in the case shown in FIG. 7, the time period from a point in time when the vehicle 10 starts moving along the target travelling route to a point in time when the vehicle 10 reaches the target parking position will be shorter as compared with the case shown in FIG. 4.

(Specific Operation)

Next, specific operation of the drive assistance ECU 21 related to the parking assistance processing will be described. The CPU (hereinafter also referred to as "the CPU" for simplification) of the drive assistance ECU 21 executes a "route obtaining processing routine" represented by a flowchart shown in FIG. 8, and a "travelling assistance processing routine" represented by a flowchart shown in FIG. 9, respectively every time a predetermined time elapses.

In these routines, the CPU refers to and sets a value of a route flag Xar and a travelling flag Xta which are set to "0" in an initialization routine (not shown) which is executed by the CPU when the drive assistance ECU 21 is booted (turned on) (namely, a predetermined ignition-ON operation is performed by the driver). The value of the route flag Xar is set to "1" during a time period from a point in time when the target travelling route is obtained by the route obtaining processing to a point in time when the travelling assistance processing is started. The value of the travelling flag Xta is set to "1" during a time period from a point in time when the travelling assistance processing is started to a point in time when the vehicle 10 reaches the target parking position.

(Case A)

It is now assumed that the parking assistance processing is not being executed (namely, neither the route obtaining processing nor the travelling assistance processing is not being executed) and the parking assistance starting operation has not been performed.

Figure 8:
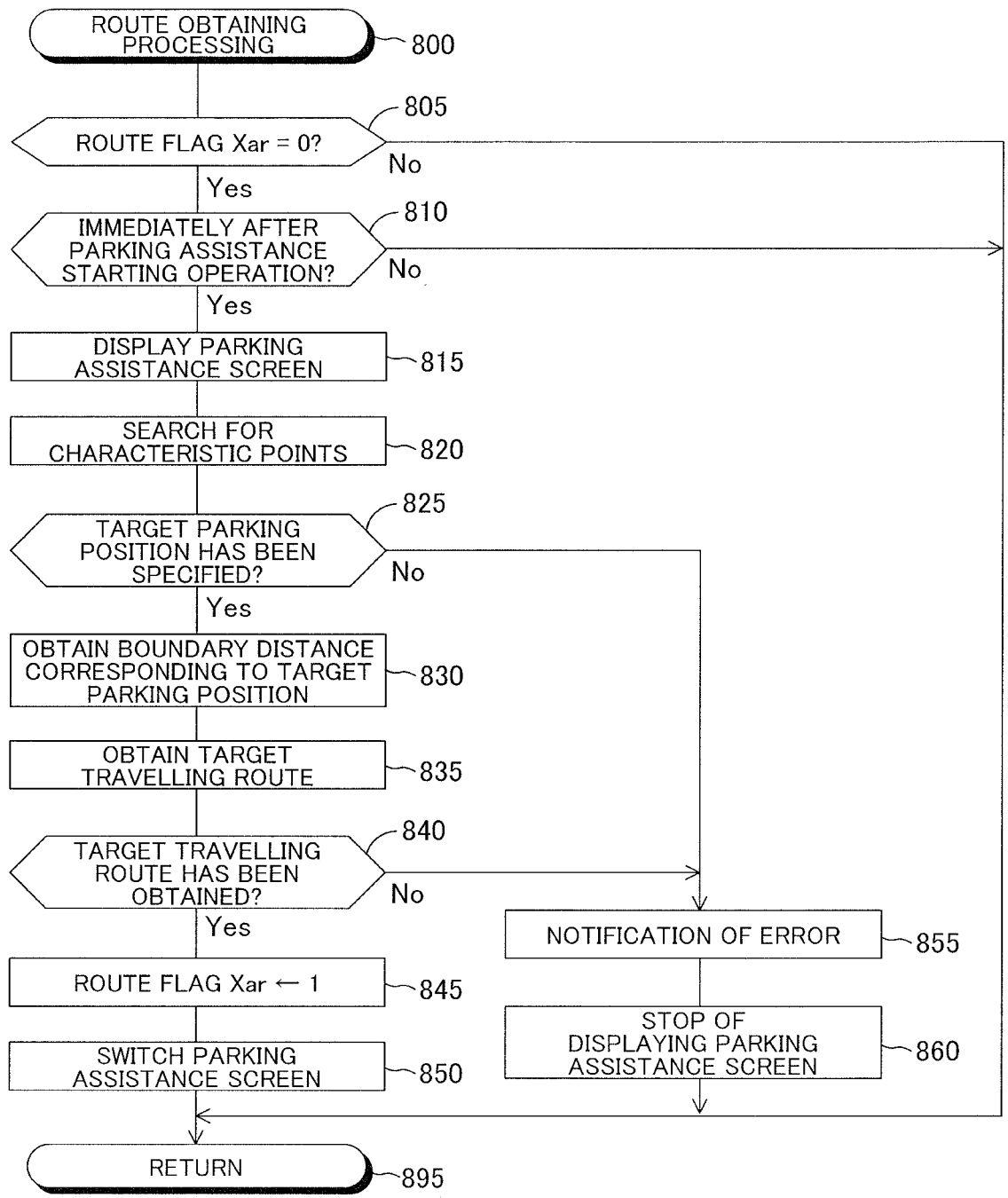
FIG. 8 is a flowchart representing a route obtaining processing routine executed by the present control apparatus.

In this case, when an execution timing of the route obtaining processing routine has come, the CPU starts the process from step 800 of FIG. 8 and proceeds to step 805 so as to determine whether or not the value of the route flag Xar is "0."

According to the assumption described above, the value of the route flag Xar is "0," and thus, the CPU makes a "Yes" determination in step 805 and proceeds to step 810 so as to determine the present time point is immediately after the parking assistance starting operation is performed. Namely, the CPU determines whether or not the present routine is being executed for the first time after the parking assistance starting operation was performed.

According to the assumption described above, the parking assistance starting operation has not been performed, and thus, the CPU makes a "No" determination in step 810 and directly proceeds to step 895 so as to end the present routine.

Figure 9:
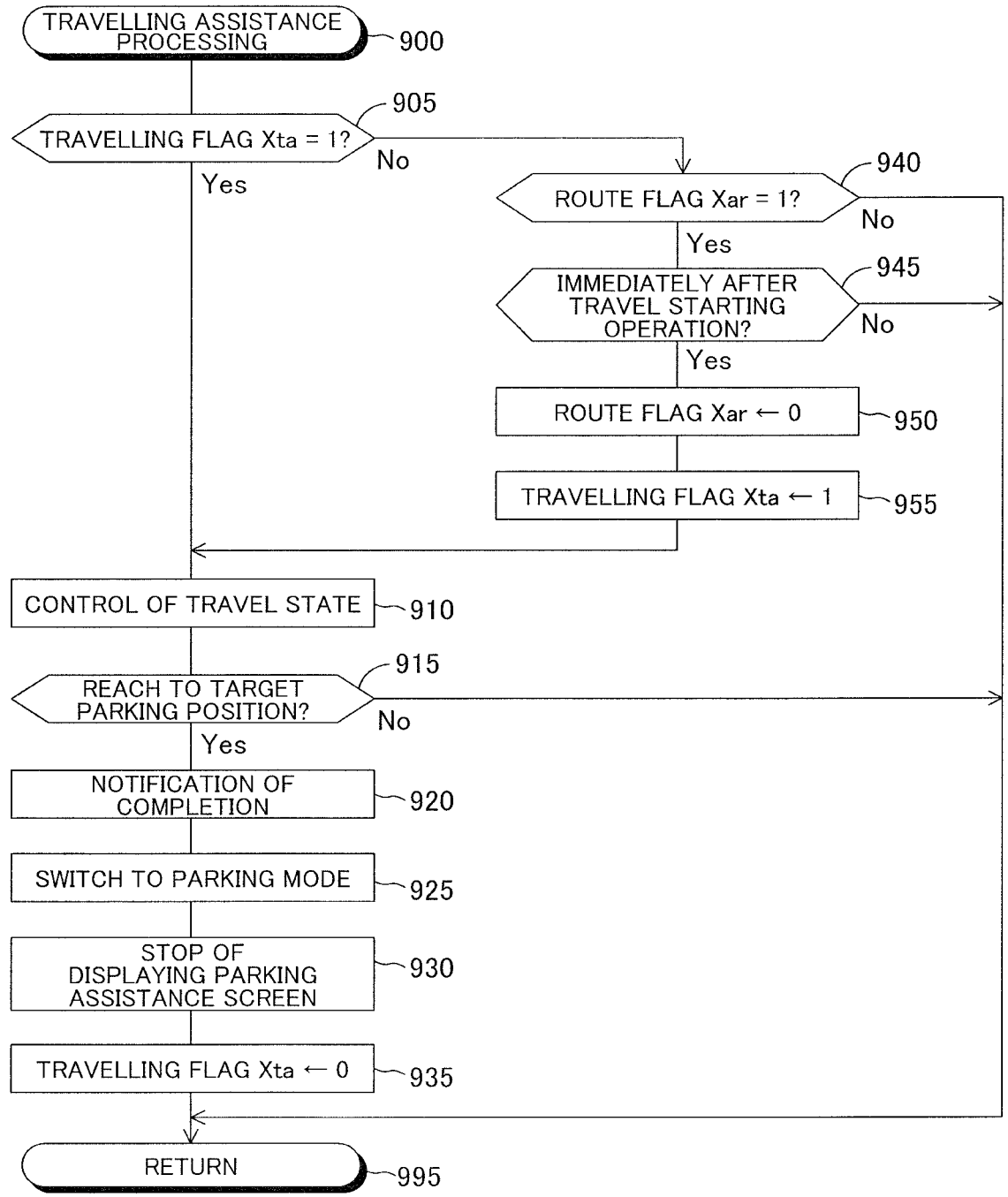
FIG. 9 is a flowchart representing a travel assistance processing routine executed by the present control apparatus.

On the other hand, when an execution timing of the travelling assistance processing routine shown in FIG. 9 has come, the CPU start the process from step 900 of FIG. 9 and proceeds to step 905 so as to determine whether or not the travelling flag Xta is "1."

According to the assumption described above, the value of the travelling flag Xta is "0," the CPU makes a "No" determination in step 905 and proceeds to step 940 so as to determine whether or not the value of the route flag Xar is "1." According to the assumption described above, the route obtaining processing has not been executed, and thus (namely, the target travelling route has not been obtained), the value of the route flag Xar is "0." Accordingly, the CPU makes a "No" determination in step 940 and directly proceeds to step 995 so as to end the present routine.

(Case B)

It is assumed that thereafter the route obtaining processing routine is being executed for the first time after the parking assistance starting operation has been performed. In addition, it is assumed that that the target parking position can be specified on the basis of the characteristic points contained in the surrounding image and the target travelling route can be obtained.

In this case, the CPU makes a "Yes" determination in step 810 and proceeds to step 815 so as to display the parking assistance screen Sa1 shown in FIG. 3A on the display 73. At this time, the CPU stores a screen displayed on the display 73 immediately before the parking assistance screen Sa1 is displayed in the RAM of the drive assistance ECU 21 as a "previous displayed screen."

Subsequently, the CPU proceeds to step 820 so as to search for the characteristic points. Namely, the CPU searches regions similar to the characteristic points contained in the surrounding image (specifically, the overhear image generated on the basis of the surrounding image). Furthermore, the CPU proceeds to step 825 so as to the determine whether or not the target parking position has been specified.

More specifically, if the position of the target parking position with respect to the present position of the vehicle 10 has been obtained on the basis of the characteristic points detected from the surrounding image, the determination condition of step 825 is satisfied. Alternatively, if the parking section has been extracted on the basis of the road surface marking contained in the surrounding image, the determination condition of step 825 is satisfied, even though a sufficient number of the characteristic points has not been detected.

According to the assumption described above, the target parking position can be specified on the basis of the characteristic points contained in the surrounding image, and thus, the CPU makes a "Yes" determination in step 825 and proceeds to step 830 so as to obtain the boundary distance (namely, one of "wide," "middle" and "narrow") corresponding to the specified target parking position. Subsequently, the CPU proceeds to step 835 so as to obtain the target travelling route.

Furthermore, the CPU proceeds to step 840 so as to determine whether or not the target travelling route has been obtained successfully. According to the assumption described above, the target travelling route can be obtained, and thus, the CPU makes a "Yes" determination in step 840 and proceeds to step 845 so as to set the value of the route flag Xar to "1."

Subsequently, the CPU proceeds to step 850 so as to switch the parking assistance screen displayed on the display 73. Namely, the CPU displays the parking assistance screen Sa2 shown in FIG. 3B on the display 73 instead of the parking assistance screen Sa1. Furthermore, the CPU proceeds to step 895.

When the route obtaining processing routine is executed next time, the value of the travelling flag Xta is "1." Therefore, the CPU makes a "Yes" determination in step 805 and proceeds to step 895 directly.

When the travel assistance processing routine is executed immediately after this process, the CPU makes a "Yes" determination in step 940 and proceeds to step 945 so as to determine whether or not the present time point is immediately after the travel starting operation was performed. Namely, the CPU determines whether or not the present routine is being executed for the first time after the travel starting operation was performed.

Since It is immediately after the parking assistance screen Sa2 was displayed on the display 73, the travel starting operation has not been performed. Accordingly, the CPU makes a "No" determination in step 945 and proceeds to step 995 directly.

(Case C)

Next, it is assumed that the route obtaining processing routine is being executed for the first time after the parking assistance starting operation has been performed and the target parking position cannot be specified. Namely, in this case, the characteristic points corresponding to any one of "Parking Position 1," "Parking Position 2" and "Parking Position 3" cannot be extracted from the surrounding image (specifically, the overhead image obtained on the basis of the surrounding image) and the road surface marking indicating the parking section cannot be extracted.

In this case, the CPU makes a "No" determination in step 825 and proceeds to step 855 so as to notify the driver of an error. Specifically, the CPU notifies the driver that it is impossible to make (let) the vehicle 10 reach the target parking position by the travelling assistance processing through characters displayed on the display 73 and a voice message played by the speaker 74.

Subsequently, the CPU proceeds to step 860 so as to stop displaying the parking assistance screen Sa1 on the display 73. Specifically, the CPU starts displaying the previous displayed screen on the display 73. Furthermore, the CPU proceeds to step 895 directly.

Notably, when the target travelling route can be obtained while the target parking position has been specified, the CPU makes a "No" determination in step 840 and proceeds to step 855 so as to notify the driver of the error.

(Case D)

It is assumed that the travel assistance processing routine is being executed for the first time after the travelling starting operation has been performed when the parking assistance screen Sa2 was displayed on 73.

In this case, the CPU makes a "Yes" determination in step 945 and proceeds to step 950 so as to set the value of the route flag Xar to "0." Subsequently, the CPU proceeds to step 955 so as to set the value of the travelling flag Xta to "1."

Furthermore, the CPU proceeds to step 910 so as to control a travel state of the vehicle 10. Namely, the CPU sends, as necessary, the drive force control request, the shift change request, the brake force control request and the steering angle control request to the respective ECUs, each corresponding to each of the requests, to let the vehicle 10 move (travel) along the target travelling route.

Subsequently, the CPU proceeds to step 915 so as to determine whether or not the vehicle 10 has reached the target parking position. According to the assumption described above, the present point in time is immediately after the travelling assistance processing was just started, and thus, the vehicle 10 has not reached the target parking position. Therefore, the CPU makes a "No" determination in step 915 and proceeds to step 995 directly.

Since then, the process of step 910 of the travel assistance processing routine shown in FIG. 9 is executed repeatedly until the vehicle 10 reaches the target parking position. Meanwhile, when the route obtaining processing routine is executed, the CPU makes a "No" determination in step 805 and proceeds to step 895 directly.

(Case E)

Next, it is assumed that the vehicle 10 reaches the target parking position by the travel assistance processing routine. In this case, the CPU makes a "Yes" determination in step 915 and executes processes from step 920 to step 935 described below one after another, and then proceeds to step 995. In this case, the execution of the travel assistance processing is completed.

Step 920: the CPU notifies the driver of a completion. Specifically, the CPU notifies the driver that the vehicle 10 has reached the target parking position through characters displayed on the display 73 and a voice message played by the speaker 74.

Step 925: the CPU sends, to the drive control ECU 22, the shift change request indicating that the target shift mode is the parking mode.

Step 930: the CPU stops displaying the parking assistance screen Sa2.

Step 935: the CPU sets the value of the travelling flag Xta to "0."

Notably, while the travel assistance processing is executed, the CPU executes a collision avoidance processing routine (not shown) every time a predetermined time elapses. When there is a high possibility that the vehicle 10 collides with the camera object or the sonar object while the travel assistance processing is executed, the CPU makes (lets) the vehicle 10 stop in processing of the collision avoidance processing routine. Specifically, the CPU obtains (figures out) the target brake force Bftg such that a collision between the vehicle 10 and that object is avoided, and sends the brake force control request including that target brake force Bftg to the brake control ECU 23. In addition, the CPU notifies the driver that the travel assistance processing is terminated (stopped) through characters displayed on the display 73 and a voice message played by the speaker 74. Furthermore, the CPU set the value of the travelling flag Xta to "0." In addition, the CPU starts displaying the previous displayed screen on the display 73.

As having been described above, according to the present assistance apparatus, the travelling boundary line is determined corresponding to the target parking position (namely, the travelable region is appropriately determined corresponding to the target parking position), so that the target travelling route can be obtained including as few shift switching positions as possible. In addition, according to the present assistance apparatus, since the initial value of the boundary distance is "wide," the target travelling route can be obtained including as few shift switching positions as possible even if the driver does not understand how to change the boundary distance.

The embodiment of the parking assistance apparatus according to the present disclosure has been described; however, the present disclosure is not limited to the above-described embodiments, and various modifications are possible without departing from the scope of the disclosure. For example, in the present embodiment, the steering angle θs, the shift mode, the drive force, and the brake force are automatically controlled when the travelling assistance processing is executed. However, some or all of the shift mode, the drive force, and the brake force may be controlled by the driver when the travelling assistance processing is executed.

As an example, the shift mode may be controlled (switched) by the driver. In this case, when the vehicle 10 moves along the forward section and reaches the shift switching position, the drive assistance ECU 21 may urge (prompt) the driver to operate the shift lever so as to switch the shift mode between the forward mode and the backward mode through characters displayed on the display 73 and a voice message played by the speaker 74.

Alternatively, while the travelling assistance processing is executed, the driver may control the vehicle speed Vt by operating the accelerator pedal and/or the brake pedal (typically, brake pedal only). In this case, the drive assistance ECU 21 may be configured to control the steering angle θs automatically in response to a change in the vehicle speed Vt.

In addition, according to the present embodiment, the driver can set the boundary distance to any one of the boundary distance Db1, the boundary distance Db2 and the boundary distance Db3. Namely, the boundary distance can be changed in three levels. However, the drive assistance ECU 21 may be configured so that the boundary distance can be further changed in detail. Alternatively, the drive assistance ECU 21 may be configured so that the boundary distance can be set to specific (concrete) values by the driver.

In addition, the drive assistance ECU 21 according to the present embodiment determines the travelling boundary line as straight line parallel to the longitudinal direction of the vehicle 10 at a point in time when the route obtainment processing is performed. Furthermore, the drive assistance ECU 21 displays the travelling boundary line as the dashed line Lds in the right sub screen Sb2 of the parking assistance screen Sa1 and the parking assistance screen Sa2. However, the drive assistance ECU 21 may be configured to obtain the travelling boundary line by a method different from this. For example, the drive assistance ECU 21 may be configured to extract (recognize) a road surface marking (a division line, a lane marker) defining a lane (an own lane) in which the vehicle 10 is travelling from the surrounding image and obtain, as the travelling boundary line, a straight line parallel to the own lane. In this case, the drive assistance ECU 21 displays the straight line parallel to the own lane as the dashed line Lds in the right sub screen Sb2.

Alternatively, the drive assistance ECU 21 may be configured to obtain, as the travelling boundary line, a straight line orthogonal to the longitudinal direction of the vehicle 10 located at the target parking position (namely, the vehicle position 10p).

In addition, the drive assistance ECU 21 according to the present embodiment starts the travel assistance processing automatically when the target travelling route is obtained by the execution of the route obtaining processing which is started at the beginning of the parking assistance processing. However, the drive assistance ECU 21 may be configured to start the travel assistance processing upon a predetermined operation by the driver. For example, the drive assistance ECU 21 may be configured to display a start button on the display 73 when the target travelling route is obtained, and to start the travel assistance processing when the driver performs the tapping operation to the start button.

In addition, according to the present embodiment, the driver can register up to three target parking positions in the drive assistance ECU 21 by the parking position registering processing. However, the drive assistance ECU 21 may be configured to store only one target parking position.

In addition, a part of functions realized by the drive assistance ECU 21 according to the present embodiment may be realized by another ECU. Namely, those functions of the drive assistance ECU 21 are realized by a plurality of ECUs.

What is claimed is:
1. A parking assistance apparatus comprising:
cameras configured to obtain a surrounding image of a vehicle;
a steering motor configured to change a steering angle of said vehicle, and
an electronic control unit, including at least one programmed processor and a memory, and configured to:

store a boundary distance in said memory, said boundary distance being a configurable value that is changed by a driver of said vehicle;

specify a target parking position based on said surrounding image;

obtain a target travelling path from a present position of said vehicle to said target parking position, using said boundary distance stored in said memory, wherein the target travelling path is defined for said vehicle to move backward to reach said target parking position and said vehicle to move in a region on a side of said target parking position with respect to a travelling boundary line, said travelling boundary line being a straight line which is positioned in an area in front of said vehicle when said vehicle is located at said target parking position and is away from a reference position by said boundary distance stored in said memory, wherein said reference position is a position at a front end and at a center in a lateral direction of said vehicle when said vehicle is located in said target parking position; and execute a travelling assistance processing for controlling at least said steering motor in order to control said steering angle of said vehicle such that said vehicle moves along said target travelling path.

2. The parking assistance apparatus according to claim 1, wherein said electronic control unit is configured to obtain said travelling boundary line such that said travelling boundary line is parallel to a longitudinal direction of said vehicle when said vehicle is located at said present position.

3. The parking assistance apparatus according to claim 1, wherein said electronic control unit is configured to:

store a plurality of registered parking positions in said memory;

store distances, each of the stored distances respectively corresponding to each of said registered parking positions; and select one of said registered parking positions as said target parking position, and use one of said stored distances corresponding to said selected one of said registered parking positions as said boundary distance used for obtaining said target travelling path.

4. The parking assistance apparatus according to claim 1, wherein said electronic control unit is configured such that said boundary distance has been set to a maximum value in a range where said boundary distance is configurable when said boundary distance has not been changed by said driver.

5. The parking assistance apparatus according to claim 1, wherein said electronic control unit is configured to obtain said travelling boundary line such that said travelling boundary line is orthogonal to a longitudinal direction of said vehicle when said vehicle is located at said target parking position.

6. The parking assistance apparatus according to claim 1, further comprising a display which functions as a touch panel, and wherein said electronic control unit is configured to change said boundary distance stored in said memory when said driver changes said boundary distance stored in said memory by touching said display.

* * * * *